United States Patent
Caffeau et al.

(10) Patent No.: US 11,673,431 B2
(45) Date of Patent: Jun. 13, 2023

(54) TRUCK TIRE WITH CONTENTION ARMATURE OVERLAP

(71) Applicant: Compagnie Generale des Etablissements Michelin, Clermont-Ferrand (FR)

(72) Inventors: Charlotte Caffeau, Greer, SC (US); Dale Green, Greer, SC (US); Remy Guerin, Greer, SC (US); Olivier Bergamaschi, Ladoux (FR)

(73) Assignee: Compagnie Generale des Etablissements Michelin, Clermont-Ferrand (FR)

(*) Notice: Subject to any disclaimer, the term of this patent is extended or adjusted under 35 U.S.C. 154(b) by 248 days.

(21) Appl. No.: 17/056,165

(22) PCT Filed: May 30, 2018

(86) PCT No.: PCT/US2018/035044
§ 371 (c)(1),
(2) Date: Nov. 17, 2020

(87) PCT Pub. No.: WO2019/231438
PCT Pub. Date: Dec. 5, 2019

(65) Prior Publication Data
US 2021/0213787 A1 Jul. 15, 2021

(51) Int. Cl.
*B60C 15/04* (2006.01)
*B60C 15/06* (2006.01)

(52) U.S. Cl.
CPC .......... *B60C 15/04* (2013.01); *B60C 15/0632* (2013.01); *B60C 2015/044* (2013.01); *B60C 2200/06* (2013.01)

(58) Field of Classification Search
CPC ................................. B60C 2015/044
See application file for complete search history.

(56) References Cited

U.S. PATENT DOCUMENTS 6,460,589 B1 * 10/2002 Auxerre ............. B60C 15/0607
152/543
2001/0050129 A1  12/2001 Ohara et al.
(Continued)

FOREIGN PATENT DOCUMENTS

DE  2458923 A  *  6/1975  ............. B29D 30/20
EP  0492504 A1  7/1992
(Continued)

OTHER PUBLICATIONS

Machine Translation: DE-2458923-A, Name not available, (Year: 2022).*

(Continued)

*Primary Examiner* — Kendra Ly
(74) *Attorney, Agent, or Firm* — Neal P. Pierotti

(57) ABSTRACT

A heavy truck tire is provided that includes a tread and a casing. The casing has a bead with a bead core having padding gum and a rod with a perimeter. A contention armature surrounds the bead core and has an overlap, a majority of which is located outward in the radial direction from the rod. The padding gum is arranged in relation to the rod such that an outer area, inner area, and an axially outer area of the padding gum have areas that are greater than or equal to 20% of the area of the perimeter of the rod. An axially inner area of the padding gum is greater than or equal to 10% of the area of the perimeter of the rod.

14 Claims, 5 Drawing Sheets

(56) References Cited

U.S. PATENT DOCUMENTS

2009/0025848 A1     1/2009   Ferlin
2009/0114332 A1     5/2009   Daghini et al.

FOREIGN PATENT DOCUMENTS

| GB | 2104461 A | 8/1982 | |
|----|-----------|--------|---|
| JP | H06239114 A | 8/1994 | |
| WO | 2010060815 A1 | 6/2010 | |
| WO | WO-2010060815 A1 * | 6/2010 | ............. B60C 15/04 |

OTHER PUBLICATIONS

Machine Translation: WO-2010060815-A1, Grisin B, (Year: 2022).*
European Patent Office; International Search Report and Written Opinion for patent application PCT/US2018/035044, filed May 30, 2018; Publisher: European Patent Office, Rijswijk, Netherlands; dated Feb. 2, 2019; pp. 1-13, enclosed.

* cited by examiner

TRUCK TIRE WITH CONTENTION ARMATURE OVERLAP

CROSS-REFERENCE TO RELATED APPLICATIONS

The present application is a 35 U.S.C. § 371 application of PCT/US18/35044 filed on May 30, 2018 and entitled "Truck Tire with Contention Armature Overlap." PCT/US18/35044 is incorporated by reference herein in its entirety for all purposes.

FIELD OF THE INVENTION

The subject matter of the present invention relates to a truck tire that has a bead design that increases bead endurance. More particularly, the present application involves a bead design that features a contention armature with an overlap on a radially outward side of the bead core.

BACKGROUND OF THE INVENTION

Heavy commercial truck tires have a tread area that engages the road surface, and a carcass with sidewalls that extend from the tread area. The sidewalls terminate in beads that are designed to engage a rim of the wheel. The beads include a bead core that that has a rod and other bead tissues that can be composed of rubber. When the tire undergoes stress in the bead area, the bead tissues may move in relation to the rod. This relative movement may cause damage to the carcass in the bead area. Truck tires are designed with robust beads to resist forces imparted thereon during driving. In order to make the bead area strong and capable of working for its intended purpose, the geometry and materials making up the bead area are optimized. Various designs of bead areas include making the rod of one component, or of multiple components, and of includes one or more structural layers within the bead.

A particular known design of a bead area is disclosed in PCT publication number WO 2010/060815 A1 titled "Tyre with Improved Bead" published on Jun. 3, 2010 and filed on Nov. 27, 2008 the entire contents of which are incorporated by reference herein in their entirety for all purposes. In this design, the rod is a single component tringle having a rectangular cross-sectional shape. The bead core includes padding gum and the rod and is arranged so that the padding gum surrounds the bead core. A contention armature surrounds the padding gum and the rod. The contention armature overlaps itself and this overlap is located radially inward on the bead core. The present design is a variation on known bead area designs and achieves a robust bead area for a truck tire.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
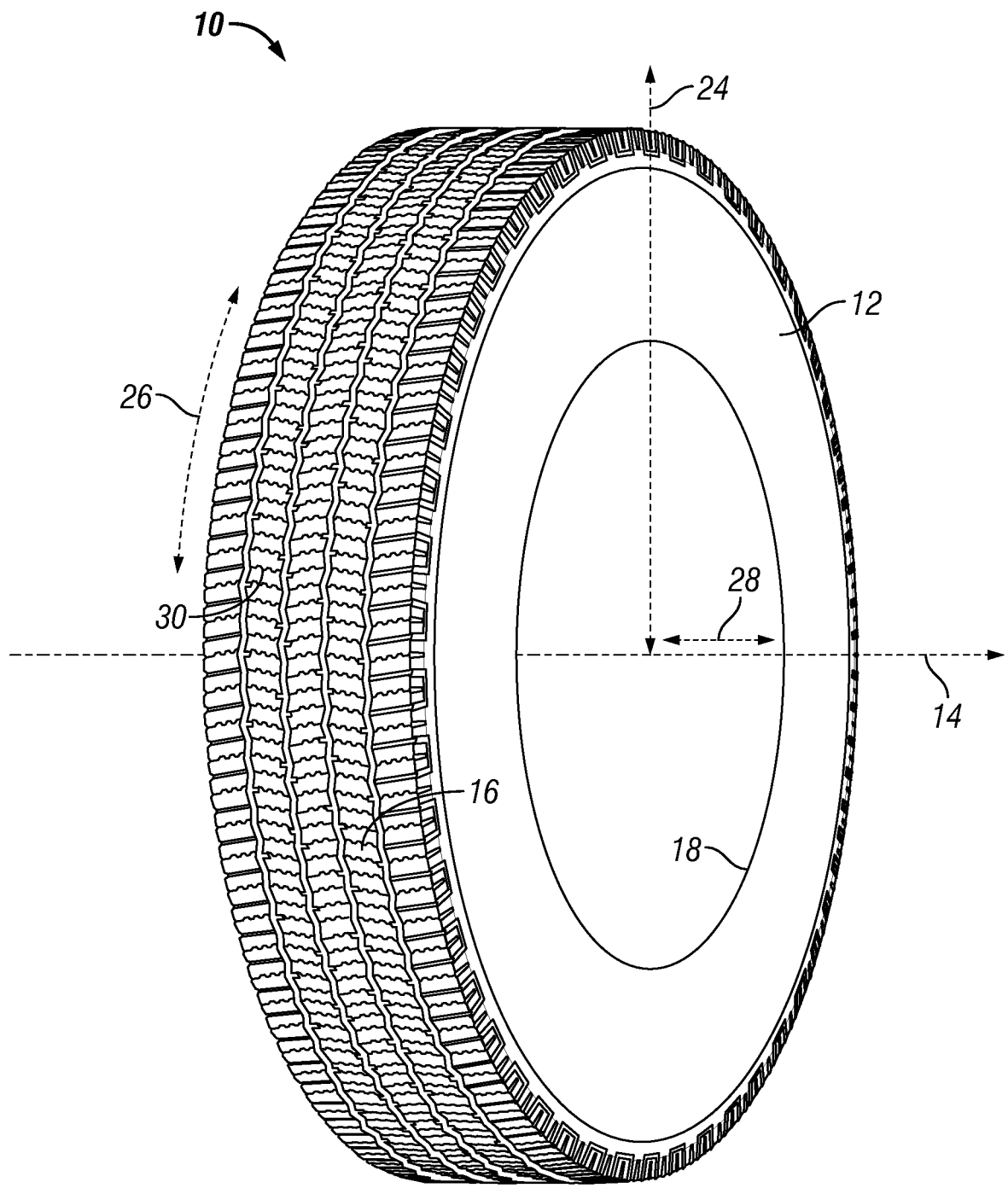
FIG. 1 is a perspective view of a heavy truck tire.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a bead 18 design of a heavy duty truck tire 10 that features a bead core 20 that has a rod 50 surrounded by padding gum 52. A contention armature 22 surrounds the rod 50 and padding gum 52 and overlaps itself to form an overlap 48 that is located in the radial direction 24 outward from the radial location of the rod 50. The majority of the overlap 48, and in some instances the entire overlap 48, is located outward from the rod 50 in the radial direction 24. The rod 50 has a perimeter 46 that is sized relative to the padding gum 52 so that different zones or areas SU, SD, SO, SI of the padding gum 52 are sized with respect to certain ratios relative to the perimeter 46.

FIG. 1 shows a tire 10 that is a heavy duty truck tire 10. In this regard, the tire 10 is not designed for nor used with a car, motorcycle, or light truck (payload capacity less than 4,000 pounds), but is instead designed for and used with heavy duty trucks such as 18 wheelers, garbage trucks, or box trucks. The tire 10 may be a steer tire, a drive tire, a trailer tire, or an all position tire. The tire 10 includes a casing 12 onto which a tread 16 is disposed thereon. The central axis 14 of the tire 10 extends through the center of the casing 12, and the axial direction 28 of the tire 10 is parallel to the central axis 14. The radial direction 24 of the tire 10 is perpendicular to the central axis 14, and the tread 16 is located farther from the central axis 14 in the radial direction 24 than the casing 12. The tread 16 extends all the way around the casing 12 in the circumferential direction 26 of the tire 10 and circles the central axis 14 360 degrees.

Figure 2:
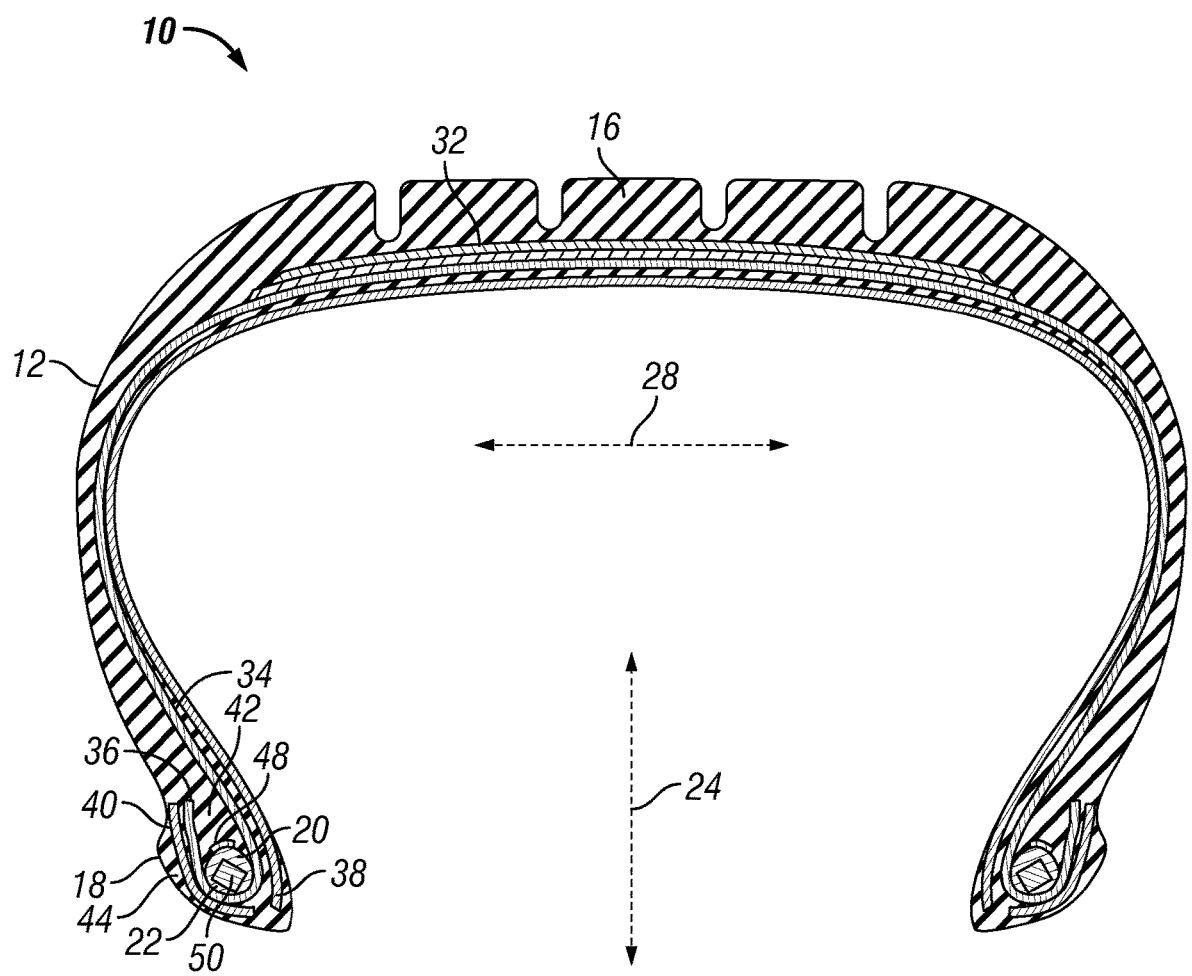
FIG. 2 is a cross-sectional view of a radial cut of a truck tire with all items in cross-section as the tire would look when mounted to a rim.

FIG. 2 is a radial cut of a tire 10 in accordance with one exemplary embodiment in which cross-sectional lines are not illustrated for purposes of clarity. Various tissues composed of different materials can be present throughout the tire 10. The tread 16 of the tire 10 is shown as being located farthest from the axial center of the tire 10 in the radial direction 24. A first belt layer 30 and a second belt layer 32 are located below the tread 16 in the radial direction 24 and comprise belts for use in strengthening and holding the form of the tire 10. The reinforcement belts of the layers 30, 32 may be crossed relative to one another, and in some instances they can be arranged at an angle of 20 degrees to one another. The casing, or carcass, 12 extends from the tread 16 and includes sidewalls of the tire 10 terminating in a pair of beads 18 that are arranged for mounting onto the rim of the wheel of the vehicle. A bead core 20 is located in each one of the beads 18 and is present to provide strength and a gripping force in the bead 18 for retention onto the rim. The left hand side bead 18 can be a mirror image of the right hand side bead 18 and both beads 18 can have tissues that are made of the same material. Some of the tissues are located only in the bead 18, while others are located in the bead 18 and extend therefrom. For instance, an inner liner 38 is inside of the bead 18 and extends to an inner, exterior side of the bead 18 before extending up the sidewall of the casing 12. The inner liner 38 then extends across the entire inner side of the crown in the axial direction 28 before extending into and forming the inner side of the right hand side wall of the casing 12. The inner liner 38 then terminates inside of the right hand side bead 18 and is arranged in a similar mirror-image manner to its presence in the left hand side bead 18. The inner liner 38 is thus a tissue of the tire 10 that extends all the way from one bead 18 to the other bead 18 and is made of a material that is fluid tight so that fluid between the tire 10 and rim is maintained therein for purposes of maintaining inflation pressure of the tire 10.

The tire 10 includes a tissue designated as a bit outward journey 34 that is located within one of the beads 18 and extends through the casing 12 and crown to the other bead 18. The bit outward journey 34 wraps around the bead core 20 and is designated as a bit return 36 in the location outward in the axial direction 28 from the bead core 20. Other tissues in the tire 10 such as a stiffener layer 40 and a bead filler 42 do not extend into the sidewalls of the casing 12 or the crown, but are instead only located in the bead 18.

Figure 3:
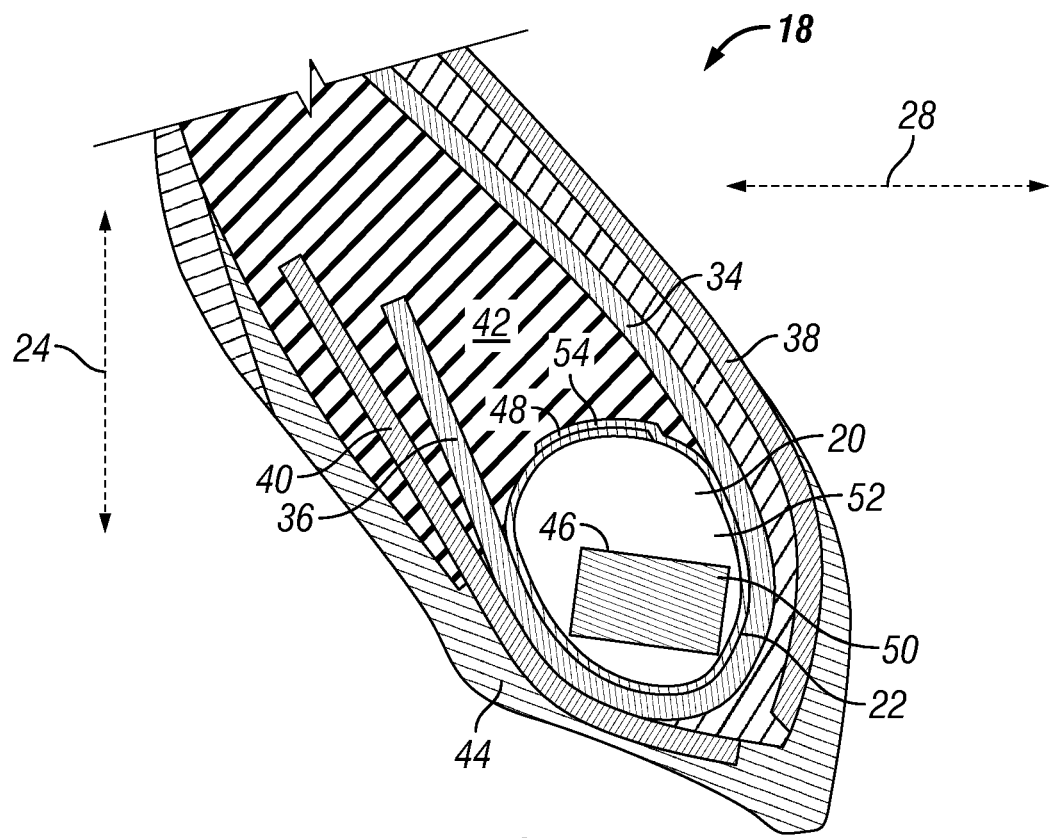
FIG. 3 is a cross-sectional view of a bead as it would look when mounted to a rim.

FIG. 3 is a close up view of the left hand side bead 18 of FIG. 2. The bead core 20 is made up of a rod 50 and padding gum 52. The rod 50 is surrounded by the padding gum 52 and in some instances may be completely surrounded on all sides by the padding gum 52. Surrounding the bead core 20 is a contention armature 22 that can be made of nylon in some embodiments. The rod 50 as shown is a single piece and has a rectangular cross-sectional shape. Such a rod 50 is sometimes referred to as a tringle because of this rectangular cross-section. However, in other embodiments the rod 50 can be made of multiple components and these components could have any cross-sectional shape. The contention armature 22 wraps around the padding gum 52 and overlaps itself to form an overlap 48. This overlap 48 is located in the radial direction 24 outward from the tringle 50 and on the radial outward end of the padding gum 52 of the bead core 20. A majority of the overlap 48 is located outward from the rod 50 in the radial direction 24. In some embodiments, the entire overlap 48 is located outward from the rod 50 in the radial direction 24. The overlap 48 is offset in the axial direction 28 from the bit outward journey 34 and the bit return 36 so that the overlap 48 does not engage either of these components 34, 36. The bead 18 includes bead filler 42, sometimes referred to as gum stuffing, that is between and engages both the bit outward journey 34 and the bit return 36. The contention armature 22 engages the bead filler 42, the bit outward journey 34, and the bit return 36. On the inside of the contention armature 22, the rod 50 engages the contention armature 22 at two locations. In other embodiments, the rod 50 is free from contact with the contention armature 22. The contention armature 22 functions to stabilize the geometry of the padding gum 52 and the bead 18. If the contention armature 22 were not present, the padding gum 52 would assume a more square shape upon formation, and would assume a more oval shape when the tire 10 is used. The contention armature 22 thus causes the tissues of the bead 18 to be desirably shaped so that they can function in an intended manner. It is to be understood that other truck tires 10 can be made without a contention armature 22 and can function in a completely normal and safe manner. The addition of a contention armature 22 may provide an even higher bead 18 endurance performance than in those instances in which a contention armature 22 is absent in the bead 18. However, various truck tire 10 designs exist that are fully functional and safe that both include and do not include a contention armature 22.

The rod 50 is made of metal, and in some instances can be made of steel or aluminum. The padding gum 52 is a rubber mix that is stiff but is not as stiff or flexible as the material making up the rod 50. The contention armature 22 can be made of HT nylon. The contention armature 22 may be made of a composite made of a rubber mix and textile fiber, and in some instances the textile fibers can be nylon. The contention armature may be a calendered tissue, a layer of fabric, or other types of material in other embodiments. This is a tissue with cables that are oriented around the circumference of the padding gum 52 and thus are not aligned in the circumferential direction 26 of the tire 10 but are instead aligned in the direction of the contention armature 22 on the page as in FIG. 3. The contention armature 22 is stiffer than the padding gum 52 in the direction of the cables of the contention armature 22. The bead filler 42 is a rubber mix that is different than the rubber mix making up the padding gum 52. The material making up the bead filler 42 is more flexible than the material making up the padding gum 52. The bit outward journey 34 is a composite material that includes metal cords and a rubber mix. The bit outward journey 34 in the direction of its cords is stiffer than the contention armature 22, the bead filler 42, and the padding gum 52.

The stiffener layer 40 is located outboard from the bit return 36 in the axial direction 28 and contacts the bit return 36 along a portion of its length. The stiffener layer 40 terminates in the bead 18 so as that some of it is located inward in the radial direction 24 from the bead core 20. The bead 18 includes an anti-abrasive strip 44 that is on the outside of the bead 18 and designed to engage the rim. The anti-abrasive strip 44 engages the stiffener layer 40. The stiffener layer 40 is shown in an engaged configuration in FIG. 3 in which the stiffener layer 40 extends inward in the radial direction 24 to be completely inward of the contention armature 22 in the radial direction 24. In other embodiments, the stiffener layer 40 may be in an unengaged configuration in which it does not extend as far inward in the radial direction 24 as shown in the FIG. 3 engaged configuration. In some instances the contention armature 22 in the unengaged configuration does not extend inward of the contention armature 22 in the radial direction 24, and in other instances in the unengaged configuration the contention armature 22 does not extend inward of the rod 50 in the radial direction 24.

Figure 4:
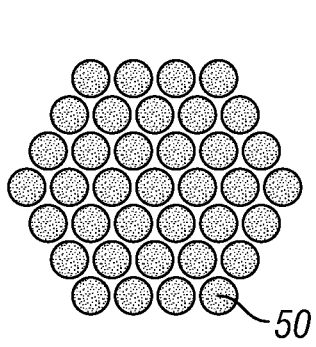
FIG. 4 is a cross-sectional view of a bead made of a series of pieces with the cross-sectional lines not shown for clarity.
Figure 5:
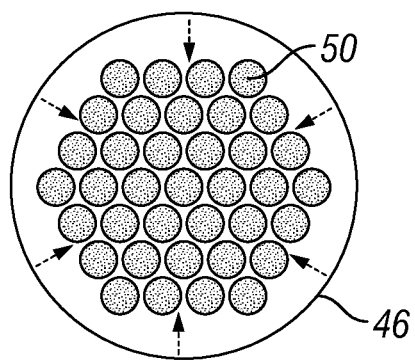
FIG. 5 is the view of FIG. 4 but with a perimeter as an imaginary rubber band stretched around the pieces of the bead.
Figure 6:
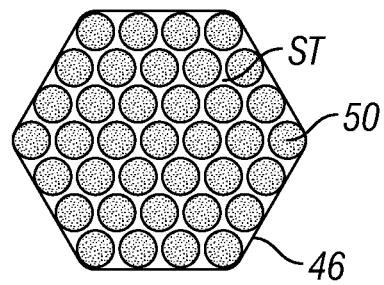
FIG. 6 is the view of FIG. 5 with force on the imaginary rubber band released to cause it to contract onto the pieces of the bead.
Figure 7:
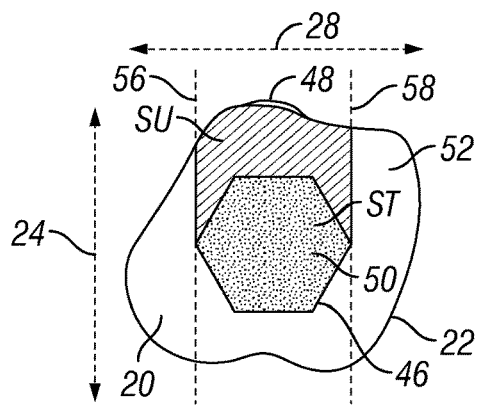
FIG. 7 is a cross-sectional view of a bead core as it would look when mounted to a rim with the cross-sectional lines removed for clarity in which the outer area of the padding gum is denoted.

With reference now to FIG. 4, a rod 50 is shown that is made up of a plurality of smaller rods that each have a circular cross-sectional shape. The plurality of rods are arranged next to one another so as to form a hexagonal shaped rod 50. The spaces between the smaller rods can be empty or may be filled with padding gum 52 in different embodiments. The area ST is the cross-sectional area of the rod 50. However, since the rod 50 could in some instances be made of a number of smaller components, the cross-sectional area ST needs to be defined. In this regard, a perimeter 46 is used to define the cross-sectional area ST. The perimeter 46 is located around all of the pieces of the rod 50 as shown in FIG. 5, and one can imagine the perimeter 46 as a rubber band that is stretched around all of these pieces of rod 50 and wants to contract on its own towards its center. The arrows in FIG. 5 show the biasing force of the perimeter 46 and the direction it wants to contract in after being extended. FIG. 6 shows release of the force on the stretched perimeter 46 and its contraction until it engages the pieces of the rod 50. The shape the perimeter 46 assumes in FIG. 6 is that of a hexagon and the area ST is the area of this hexagon. Depending upon how the pieces of the rod 50 are arranged, the shape the perimeter 46 takes upon its imaginary release can be varied in accordance with various exemplary embodiments, and it is to be understood that the hexagon shape in FIG. 6 is but one example. The contraction of the perimeter 46 to its minimum area shown in FIG. 6 is made based upon engagement with the pieces of the rod 50 while ignoring the presence of any padding gum 52, contention armature 22, or other filler rubber or other materials into which the rod 50 pieces are embedded. The area ST is thus measured by taking the area formed by perimeter 46 after expanding forces are released on the imaginary rubber band perimeter 46 and it contracts to a state held in place by the presence of the pieces of the rod 50.

The area ST is compared to the area of different sections of the padding gum 52. The area of the padding gum 52 is that area bound by the contention armature 22 and does not include the area of the contention armature 22. FIGS. 7-10 show the rod 50 disposed within the padding gum 52, and the padding gum 52 has an outer perimeter that is irregular in shape, but could be circular or more symmetric in shape, for example generally oval in shape as shown in FIG. 3, in other embodiments. The same bead core 20 arrangement is shown in FIGS. 7-10 but different sections of the bead core 20 are highlighted for explanation. A relationship between the area ST of the rod 50 and a particular section of the padding gum 52 is disclosed in relation to FIG. 7. Here, a first radial line 56 is drawn and extends in the radial direction 24 and is parallel to the radial direction 24. The first radial line 56 is located in the axial direction 28 at the outermost point of the perimeter 46 of rod 50 in the axial direction 28. A second radial line 58 is likewise drawn and extends in the radial direction 24 and is parallel to the radial direction 24. The second radial line 58 is located in the axial direction 28 at the innermost point of perimeter 46 of the rod 50 in the axial direction 28. An outer area SU of the padding gum 52 is defined as the area bounded by the first and second radial lines 56, 58 and located outward in the radial direction 24 from the perimeter 46 of the rod 50 and bound by the contention armature 22. The bead 18 is arranged so that the outer area SU is greater than or equal to 20% of the area ST. This relationship may be expressed by the equation $SU >= 0.2\, ST$. In one instance of the bead 18, the bead core 20 is arranged so that $SU/ST=0.9$.

Figure 8:
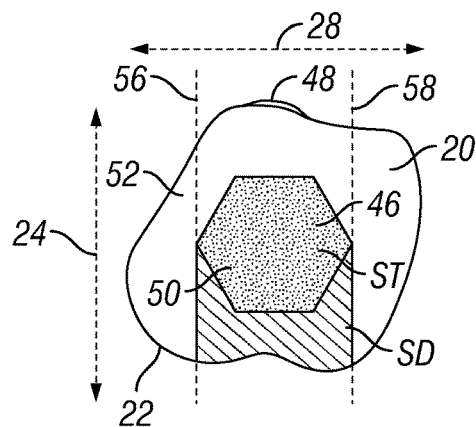
FIG. 8 is a cross-sectional view of the bead core of FIG. 7 but in which the inner area of the padding gum is denoted.

FIG. 8 illustrates the designation of the inner area SD that uses the same radial lines 56, 58 as previously described. The inner area SD is defined as the area of the padding gum 52 that is between the first radial line 56 and the second radial line 58 in the axial direction 28 and is located inward from the perimeter 46 in radial direction 24 and bound by the contention armature 22. The bead 18 is set up so that the inner area SD is greater than or equal to 20% of the area ST. The relationship may be expressed by the equation $SD >= 0.2\, ST$. In one set up of the bead core 20, the ratio of $SD/ST=0.36$.

Figure 9:
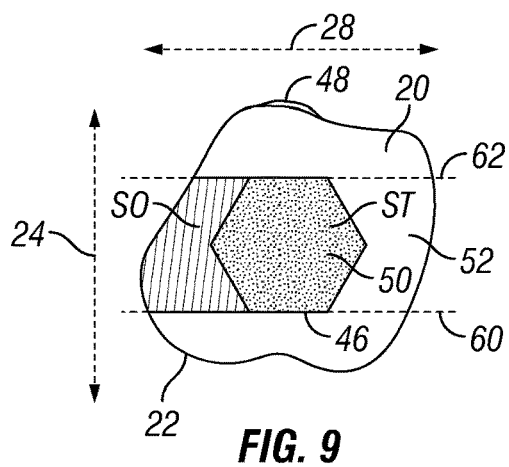
FIG. 9 is a cross-sectional view of the bead core of FIG. 7 but in which the axially outer area of the padding gum is denoted.

FIG. 9 illustrates an axially outer area SO of the padding gum 52. To define area SO, the first and second radial lines 56, 58 are not needed. Instead, a first axial line 60 is drawn so that it intersects the innermost radial point of the perimeter 46 in the radial direction 24 and extends in the axial direction 28 so as to be parallel to the axial direction 28. A second axial line 62 is also drawn in FIG. 9 and is a line that extends through the outermost radial point of the perimeter 46 in the radial direction. The second axial line 62 also extends in the axial direction 28 so as to be parallel to the axial direction 28. The axially outer area SO is defined as the area of the padding gum 52 that is between the first axial line 60 and the second axial line 62 in the radial direction 24 and is bound by the perimeter 46 and the contention armature 22 in the axial direction 28. The axially outer area SO is greater than or equal to 20% of the area ST. This relationship is expressed by the equation $SO >= 0.2\, ST$. In the described setup of the bead core 20, the ratio of $SO/ST=0.36$.

Figure 10:
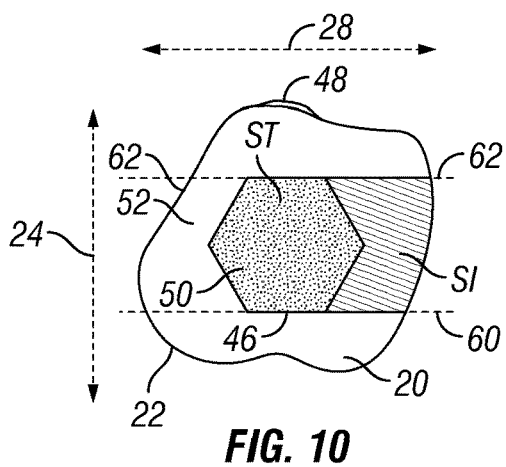
FIG. 10 is a cross-sectional view of the bead core of FIG. 7 but in which the axially inner area of the padding gum is denoted.

The axially inner area SI of the padding gum 52 is denoted in FIG. 10 and is bounded in the radial direction 24 by the first axial line 60 and the second axial line 62. The axially inner area SI is also bounded by the perimeter 46 so that the perimeter 46 is located outward from the area SI in the axial direction 28, and so that the axially inner area SI is axially outward from its points of engagement with the contention armature 22. The rod 50 and its perimeter 46 are between the axially inner area SI and the axially outer area SO in the axial direction 28. The axially inner area SI is constrained by the equation $SI >= 0.1\, ST$. In the described set up of the bead core 20, the ratio of $SI/ST=0.32$.

Figure 11:
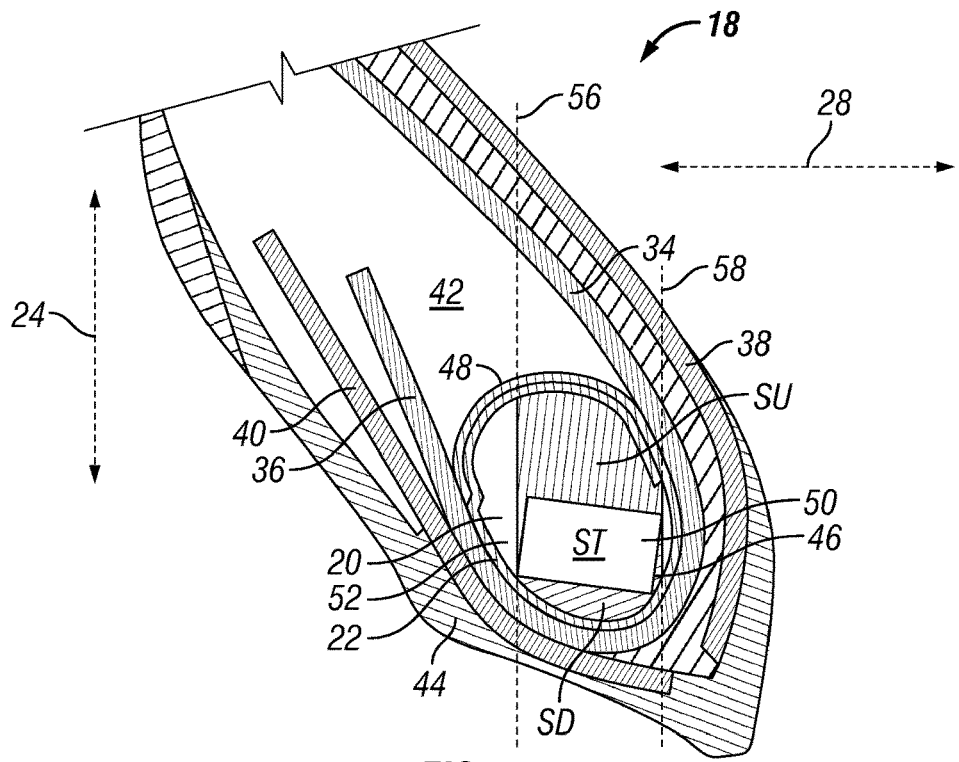
FIG. 11 is a cross-sectional view of a bead as it would look when mounted of a rim in accordance with another exemplary embodiment clarity and in which the inner and outer areas of the padding gum are denoted.
Figure 12:
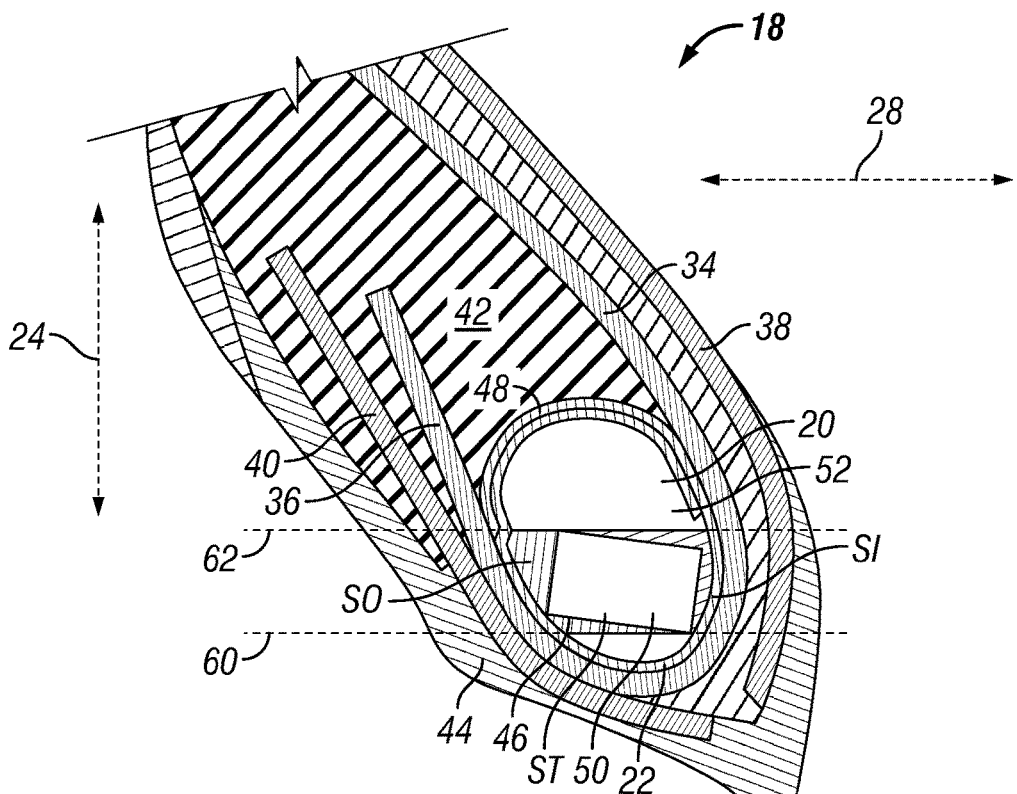
FIG. 12 is a cross-sectional view of the bead of FIG. 11 in which the axially inner and axially outer areas of the padding gum are denoted.

Another version of the tire 10 having bead 18 is shown in FIGS. 11 and 12. The two figures are the same as one another with the exception of their markings designating the outer area SU and inner area SD in FIG. 11, and the axially outer area SO and the axially inner area SI in FIG. 12. In FIG. 11, the rod 50 is not made of multiple pieces but is instead a single solid piece that has a rectangular cross-section. Such a rod 50 is sometimes referred to as a tringle 50. The perimeter 46 traces the outside edges of the tringle 50, and the area ST can be found by multiplication of the base and height of the rectangle forming the tringle 50. The outer area SU is denoted in the same manner as discussed above with the description relating to FIG. 7 and is shaded in with cross-hatching that extends upwards left to right. The inner area SD is denoted in the same manner as described above with reference to FIG. 8 and is shaded with cross-section hatching that runs downward left to right. FIG. 12 shows the same bead core 20 as FIG. 11 but marked up to identify the axially outer area SO and the axially inner area SI. The axially outer area SO has cross-hatching that extends vertically and the axially inner area SI has cross-hatching that extends horizontally. The axially outer area SO and the axially inner area SI are denoted in FIG. 12 in the same manners as the discussion above regarding the axially outer area SO in FIG. 9 and the axially inner area SI in FIG. 10.

The tire 10 in FIGS. 11 and 12 has an ST of 161 mm², an SU of 141 mm², an SD of 59 mm², an SO of 56 mm², and an SI of 52 mm². These dimensions of the padding gum 52 and the perimeter 46 fit within the equations discussed above. Namely, 20% of ST is 0.2×161 mm²=32.2 mm², and 10% of ST is 0.1×161 mm²=16.1 mm². SU, SD, and SO are all greater than 32.2 mm², and SI is greater than 16.1 mm² so all of the dimensions of the padding gum 52 in the bead core 20 fit as described.

With reference now back to FIG. 3, the bead core 20 is arranged in the same manner as that just discussed with respect to the bead core 20 in the FIGS. 11 and 12 embodiment. However, the contention armature 22 that surrounds the bead core 20 in FIG. 3 is different than the contention armature 22 that surrounds the bead core 20 in FIGS. 11 and 12 in that the overlap 48 of the contention armature 22 is different. In FIG. 3, the contention armature 22 completely wraps the bead core 20 such that at least a single layer of the contention armature 22 surrounds the bead core 20. The contention armature 22 is overlapped in that an overlap 48 exists in one area thus making some sections of the bead core 22 surrounded by more than just a single layer of the contention armature 22. The overlap 48 is arranged so that it is on the outer radial end of the bead core 20 in the radial direction 24. The padding gum 52 is between the overlap 48 and the rod 50. The overlap 48 engages the bead filler 42, but is spaced from and not in engagement with the bit outward journey 34 or the bit return 36.

The overlap 48 is arranged so that it is completely outward in the radial direction 24 from the rod 50 and perimeter 46. In some instances, the overlap 48 is completely outward as well from the padding gum 52 so that none of the padding gum 52 is at the overlap 48 in the radial direction 24. However, in other embodiments due to the curvature of the overlap 48 inwards in the radial direction 24, some portions of the padding gum 52 may be outward in the radial direction 24 from the overlap 48. The overlap 48 may share the same position in the axial direction 28 as portions of the padding gum 52 and portions of the rod 50 and perimeter 46. The overlap 48 is the section of the contention armature 22 that engages the bead filler 42 on one side in the radial direction 24, and that does not engage the rod 50 or perimeter 46 on an opposite side in the radial direction 24. The overlap 48 may also have a portion that is positioned outward in the axial direction 28 from the farthest axial point of the rod 50/perimeter 46 in the axial direction 28 (which would correspond to first radial line 56 in previous drawings). The overlap 48 may refer to the two layer section of the contention armature 22 such that the overlap engages both the bead filler 42 and the padding gum 52. The contention armature 22 forms a circle, and the contention armature 22 extends around less than 25% of the circumference of this circle. Placement of the overlap 48 on a radially outer end of the bead core 20 prevents two layers of the overlap 48 from being on an inner end in the radial direction 24 which may interfere with the wrapping of the bit outward journey 34 which may change an intended geometry of the tissues of the bead 18.

The bead 18 in FIGS. 11 and 12 is arranged in a similar manner, but the overlap 48 is different from that shown in FIG. 3. The overlap 48 extends around more of the circumference of the circle formed by the contention armature 22 than the overlap 48 in FIG. 3, and extends around less than 50% of the circumference of the circle. The overlap 48 in FIGS. 11 and 12 engages both the bit outward journey 34 and the bit return 36, in addition to engagement with the bead filler 42 and the padding gum 52. The overlap 48 in this embodiment extends all the way from the bit outward journey 34 to the bit return 36. With reference to FIG. 11, the overlap 48 is spaced from the rod 50 and perimeter 46 but is located at the second radial line 58 so that a portion of the perimeter 46 is at the same location in the axial direction 28 as the overlap 48. In other arrangements, the overlap 48 can be completely axially outward from the second radial line 58 in the axial direction 28. In yet other embodiments, the overlap 48 can extend so as to cross the second radial line 58 and have a portion axially inward of the second radial line 58 in the axial direction 28. On the other side, the overlap 48 extends past the first radial line 56 so that at least a portion of the overlap 48 is located outward in the axial direction 28 from the farthest outward point of the perimeter 46 in the axial direction 28.

The overlap 48 with reference to FIG. 12 is completely radially outboard from the first axial line 60 in the radial direction 24. The overlap 48 wraps around the padding gum 52 to such an extent that it terminates at the second axial line 62 in the radial direction 24. In this regard, the overlap 48 may share a common location in the radial direction 24 as the most outer position of the perimeter 46 and rod 50. In other instances the overlap 48 extends even more so that the second axial line 62 is located outward in the radial direction 24 than some of the portions of the overlap 48. However, it is to be understood that in other embodiments the overlap 48 may not extend inward in the radial direction 24 so that no portion of the overlap 48 is located at or inward from the second axial line 62 in the radial direction 24.

Figure 13:
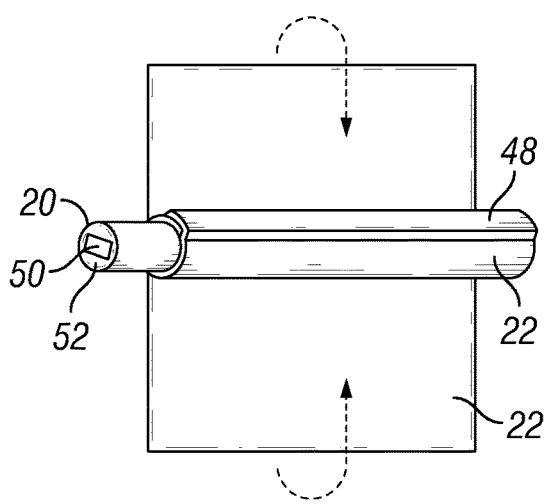
FIG. 13 is a perspective view that illustrates how the contention armature is wrapped around the bead core.

FIG. 13 shows a sheet of the contention armature 22 both before and after being rolled onto the bead core 20. The bead core 20 can be a hoop shape when placed into the tire 10, but it is illustrated as a straight rod in FIG. 13 for simplicity in showing how the contention armature 22 can be wrapped around the bead core 20 in a single pass, as a sheet that has a length the same as the length of the hoop of the bead core 20, so that only a single layer of contention armature 22 is present, except for the overlap 48 on the exterior that results in two layers at one point.

Figure 14:
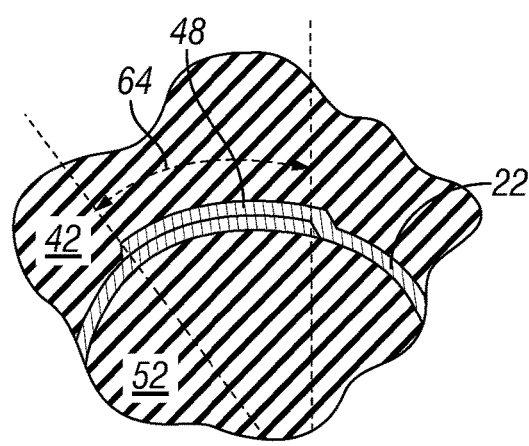
FIG. 14 is a cross-sectional view of the overlap of the contention armature.

FIG. 14 shows a close up of a portion of the contention armature 22 and the overlap 48. A length 64 of the overlap 48 is noted and is the length of the double layer formed by the overlap 48. The length 64 may be up to 10%, up to 20%, up to 30%, up to 40%, or up to but less than 50% of the circumference of the contention armature 22 which is the length of the circle formed by the contention armature 22 upon wrapping around the bead core 20.

Wrapping of the bead core 20 so that the overlap 48 is located outward from the rod 50 in the radial direction 24 delivers better uniformity results than when the overlap 48 is located inwards from the rod 50 in the radial direction 24.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. A heavy truck tire that has a central axis, a radial direction, and an axial direction, comprising:
a tread;
a casing that carries the tread, wherein the casing has a bead that has a bead core that has a rod with a perimeter, wherein the bead core has padding gum, wherein the bead has a contention armature that wraps around the bead core and that engages the padding gum, wherein the contention armature has an overlap that is free from engagement with the rod, wherein a majority of the overlap is located outward in the radial direction from the rod, wherein the contention armature engages itself along the overlap and wherein the rod engages the contention armature at a location inward in the radial direction from the overlap at a part of the contention armature that is not part of the overlap, wherein the overlap extends to a position that is outward in the axial direction from the entire rod;
wherein the bead has a bit outward journey that wraps around and engages a section of the contention armature and is a separate component from the contention armature, wherein the bit outward journey extends to an opposite bead in the casing;
wherein a first radial line extends in the radial direction and is located in the axial direction at an outermost point of the perimeter in the axial direction;
wherein a second radial line extends in the radial direction and is located in the axial direction at an innermost point of the perimeter in the axial direction;
wherein a first axial line extends in the axial direction and is located in the radial direction at an innermost point of the perimeter in the radial direction;
wherein a second axial line extends in the axial direction and is located in the radial direction at an outermost point of the perimeter in the radial direction;
wherein the perimeter of the rod defines an area ST;
wherein an outer area SU of the padding gum is the area of the padding gum located outward from the perimeter in the radial direction that is bounded by the first radial line and the second radial line and the contention armature;
wherein an inner area SD of the padding gum is the area of the padding gum located inward from the perimeter in the radial direction that is bounded by the first radial line and the second radial line and the contention armature;
wherein an axially outer area SO of the padding gum is the area of the padding gum located outward from the perimeter in the axial direction that is bounded by the first axial line and the second axial line and the contention armature;
wherein the axially inner area SI of the padding gum is the area of the padding gum located inward from the perimeter in the axial direction that is bounded by the first axial line and the second axial line and the contention armature;
wherein $SU >= 0.2\ ST$;
wherein $SD >= 0.2\ ST$;
wherein $SO >= 0.2\ ST$; and
wherein $SI >= 0.1\ ST$.

2. The tire as set forth in claim 1, wherein the entire overlap is located outward in the radial direction from the rod.

3. The tire as set forth in claim 1, wherein the rod is a tringle that is a single piece and has a rectangular cross-sectional shape.

4. The tire as set forth in claim 1, wherein the bead has bead filler that engages the contention armature.

5. The tire as set forth in claim 1, wherein some portions of the overlap and the padding gum are at the same position in the radial direction.

6. The tire as set forth in claim 1, wherein the overlap is located outward in the axial direction from the first radial line.

7. The tire as set forth in claim 1, wherein the overlap is located completely outward in the axial direction from the second radial line.

8. The tire as set forth in claim 1, wherein the contention armature forms a circumference around the bead core, and wherein the overlap extends over a length of less than 25% of the circumference of the contention armature.

9. The tire as set forth in claim 1, wherein the contention armature is a single layer that surrounds the bead core with the exception of the overlap wherein the contention armature is only two layers at the overlap.

10. The tire as set forth in claim 1, wherein the contention armature is made of HT nylon.

11. The tire as set forth in claim 1, wherein the bit outward journey has a bit return that is outward in the axial direction from the contention armature.

12. The tire as set forth in claim 11, wherein the overlap is spaced from and is free from engagement with the bit outward journey.

13. The tire as set forth in claim 11, wherein the overlap engages the bit outward journey and extends around the bead core and engages the bit outward journey at the bit return.

14. The tire as set forth in claim 11, wherein the overlap engages the bit outward journey at a location inward in the axial direction from a portion of the rod and extends continuously to and engages the bit return;
and further comprising a stiffener layer outward in the axial direction from the bit return that wraps partially around the bead core and engages the bit outward journey such that the stiffener layer extends to a position that is inward from the entire bead core in the radial direction.

* * * * *